United States Patent [19]

Morimoto

[11] Patent Number: 4,466,187

[45] Date of Patent: Aug. 21, 1984

[54] PORTABLE CIRCULAR SAW

[75] Inventor: Hiroyuki Morimoto, Hiroshima, Japan

[73] Assignee: Shindaiwa Kogyo Company, Ltd., Hiroshima, Japan

[21] Appl. No.: 373,786

[22] Filed: Apr. 30, 1982

[30] Foreign Application Priority Data

Apr. 30, 1981 [JP] Japan .............................. 56-64944[U]
Apr. 30, 1981 [JP] Japan .............................. 56-64945[U]

[51] Int. Cl.³ ...................... B23D 45/16; B23D 47/00
[52] U.S. Cl. ........................................ 30/124; 30/390; 191/200
[58] Field of Search .................. 30/388–390, 30/123, 133, 124; 83/478, 100; 181/200, 205, 293; 51/170 PT

[56] References Cited

U.S. PATENT DOCUMENTS

| 17,518 | 6/1857 | Rodoboy | 83/478 |
| 1,803,068 | 4/1931 | McKeage | 30/390 |
| 2,583,238 | 1/1952 | Sutton | 181/200 X |
| 4,137,806 | 2/1979 | Segal et al. | 83/478 |

FOREIGN PATENT DOCUMENTS 54124 4/1980 Japan ................................. 30/390

Primary Examiner—E. R. Kazenske
Assistant Examiner—Douglas D. Watts
Attorney, Agent, or Firm—Cushman, Darby & Cushman

[57] ABSTRACT

An improved portable circular saw with a pair of semi-circular discs having a rotary sawing cutter disposed therebetween, the semicircular discs being fixedly secured to the upper surface of a table and vertically extending along the rotary sawing cutter with a close clearance kept therefrom, whereby remarkably high noise reduction and dust collection are ensured with substantially reduced danger of or without any danger of injuring of a part of a human body. According to another aspect of the invention a dust collecting device is provided having a dust collecting hood arranged above the upper half of the rotary sawing cutter, an inner wall included in the dust collecting hood to surround the central part of the rotary sawing cutter and a bottom plate on the table. A pair of semicircular plates may be fixedly secured onto the longer sides of the inner wall vertically extend along the rotary sawing cutter in the same manner as the aforesaid semicircular discs.

1 Claim, 7 Drawing Figures

PORTABLE CIRCULAR SAW

BACKGROUND OF THE INVENTION

1. Field of the Invention

The present invention relates to improvements in a portable circular saw and more particularly relates to a portable circular saw which has an excellent dust collecting and noise reduction capability without any danger of injuring a part of human body.

2. Description of the Prior Art

A hitherto known portable circular saw generally includes a rotary sawing cutter which is fully exposed outside of the casing of the saw and thereby a variety of troubles take place due to sawing chips and dust produced and scattered during sawing. Further, because of the arrangement that the rotary sawing cutter is exposed there is more or less danger of injuring a part of an operator, resulting in reduced efficiency in operation. It should be emphasized that unpleasant noisy sound inherent to sawing at a high speed of rotation of the rotary sawing cutter gives unbearable suffering not only to an operator but also to other persons in the vicinity of sawing. To obviate the drawbacks with the conventional portable circular saw as mentioned above a protective cover or the like is typically employed for the exposed rotary sawing cutting, but it has been found that other problems are brought about such as increased manufacturing cost, increased weight, reduced efficiency in operation or the like.

BRIEF SUMMARY OF THE INVENTION

Thus, the present invention is intended to provide an improved portable circular saw free from the drawbacks with the conventional ones. Specifically, the present invention consists in an arrangement for ensuring substantial prevention of sawing chips, reduction of noisy sound generated during sawing of a rotary sawing cutter, increased efficiency in sawing and positive prevention of injury to the human body. Further, the present invention makes it possible to provide a portable circular saw which is simple in structure, is manufactured at an inexpensive cost, is easy to handle and has excellent durability.

According to the first aspect of the present invention a pair of semicircular discs are disposed on a table with a rotary sawing cutter located therebetween. They have substantially the same configuration as that of a part of the rotary sawing cutter above the table and extend vertically along the same with a clearance of approximate 1 mm therefrom.

According to the second aspect of the present invention the portable circular saw includes a dust collecting hood removably mounted on the table so as to fully cover the upper half of the rotary sawing cutter, an inner wall disposed in said dust collecting hood to surround the central part of the rotary sawing cutter and a dust collecting chamber located at the lower part of the dust collecting hood.

Further, according to the third aspect of the present invention the portable circular saw is constructed in the form of a combination of the first and second aspects of the invention so that remarkably improved sawing chip and dust collection and noise reduction are ensured.

Other objects and advantageous features of the present invention will be apparent from the reading of the following description made in connection with the accompanying drawings which illustrate preferred embodiments of the invention.

DESCRIPTION OF PREFERRED EMBODIMENTS

Now the present invention will be described in more details with reference to the accompanying drawings.

Figure 1:
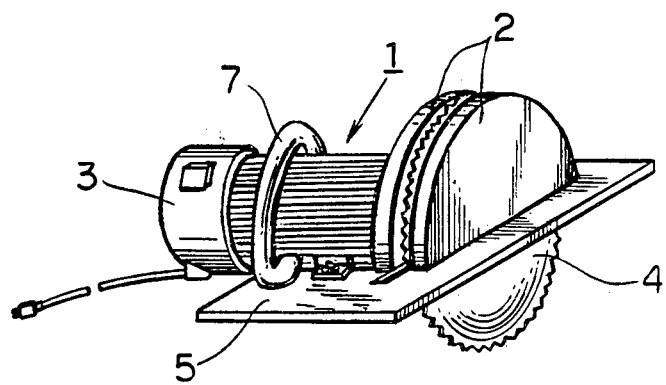
FIG. 1 is a perspective view of a portable circular saw in accordance with the first embodiment of the present invention.

First, referring to FIG. 1, a portable rotary saw 1 includes two semicircular discs 2, one of them being fixedly secured to the casing in which a motor 3 is contained, while the other one is located outward of the former in a spaced relation. The semicircular discs 2 have the substantially same configuration as that of a part of a rotary sawing cutter 4 projected above a table 5 and they may be integral with the table 5 or may be made of metallic material, plastics or the like separately from the table 5 and then be assembled to the latter in a suitable manner.

Figure 2:
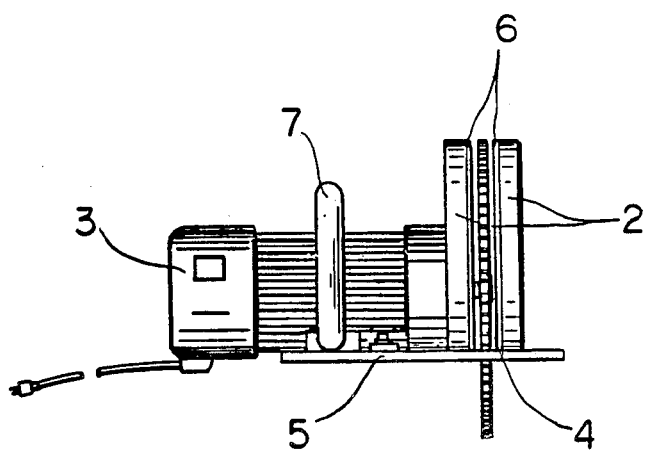
FIG. 2 is a side view of the portable circular saw in FIG. 1.

As is apparent from FIG. 2, the inside surfaces of the discs 2 facing the rotary sawing cutter 4 are lined with a layer of flexible material 6, whereby the intended dust collection and noise reduction are ensured. It should be noted that soft plastic sheet, foamed plastic sheet, felt, non-woven cloth or the like material is employed for the flexible layers 6.

In the drawing reference numeral 7 designates a handle for the portable circular saw.

Since the portable circular saw of the invention is constructed in the above-described manner, it is ensured that fine dust of wood, cement board, asbestos board or the like material produced during sawing is effectively collected and thereby is prevented from scattering to the outside and at the same time unpleasant noise such as friction sound generated due to frictional contact of the rotary sawing cutter with a workpiece or air during rotation of the former at a high speed is satisfactorily absorbed. As a result remarkably improved efficiency and safety in sawing operation are achieved.

Figure 3:
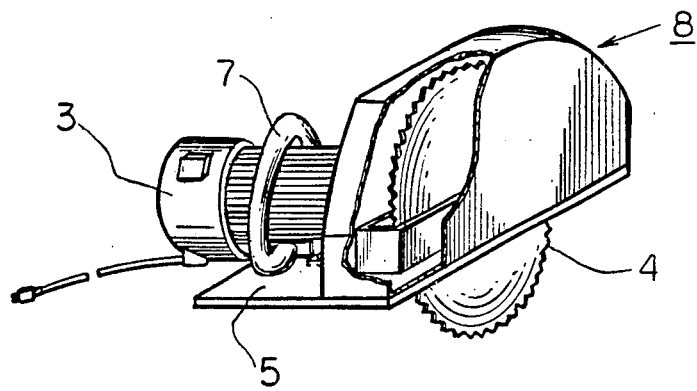
FIG. 3 is a perspective view of a portable circular saw in accordance with the second embodiment of the present invention.
Figure 4:
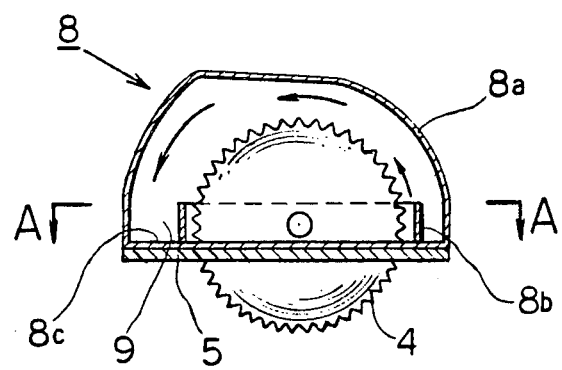
FIG. 4 is a vertical sectional view of the portable circular saw in FIG. 3, sectioned vertically through a dust collecting hood.
Figure 5:
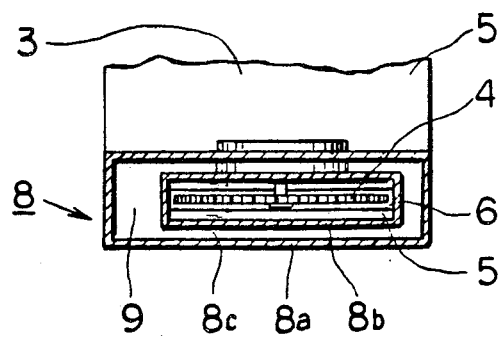
FIG. 5 is a horizontal sectional view of the portable circular saw taken in line A—A in FIG. 4.

Next, a modified embodiment of the present invention will be described with reference to FIGS. 3 to 5.

In this embodiment the semicircular discs 2 in the foregoing embodiment are replaced with a dust collecting device 8. This device 8 comprises a dust collecting hood $8_a$ encasing the upper part of the rotary sawing cutter 4, an inner wall $8_b$ surrounding the central part of the rotary sawing cutter 4 and a bottom plate $8_c$ and a dust collecting chamber 9 is formed by a combination of the lower part of the dust hood $8_a$, the inner wall $8_b$ and the bottom plate $8_c$.

As the rotary sawing cutter 4 is rotated, fine dust flows in the direction as indicated with arrow marks. Specifically, sawing chip inclusive fine dust produced during sawing rushes at an extremely high speed in the direction as indicated with the arrow marks. As it continues to flow further, its speed decreases gradually due to clashing against the inner surface of the dust collecting hood $8_a$ and finally it comes to a stop when it reaches the dust collecting chamber 9, whereby it is received and increasingly accumulated therein. As a result it is ensured that a substantial part of sawing dust does not leak to the outside.

When it is found that a certain amount of sawing dust is accumulated in the dust collecting chamber, the dust collecting hood $8_a$ is disconnected and then the accumulated dust is thrown away.

It should be noted that the portable circular saw in accordance with the second embodiment of the invention as described above has remarkably higher noise reduction and dust collecting capabilities than those in the first embodiment of the same.

Next, the third embodiment of the present invention will be described with reference to FIGS. 6 and 7.

The third embodiment of the present invention consists in a combination of both the first and second embodiments of the same so that excellent noise reduction and dust collection are ensured.

Figure 6:
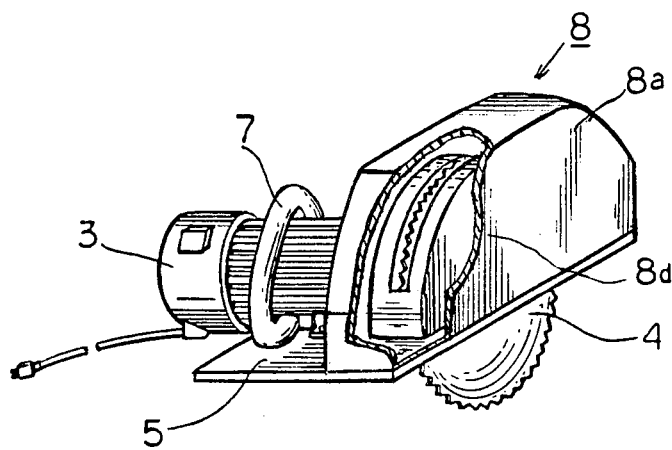
FIG. 6 is a perspective view of a portable circular saw in accordance with the third embodiment of the present invention.
Figure 7:
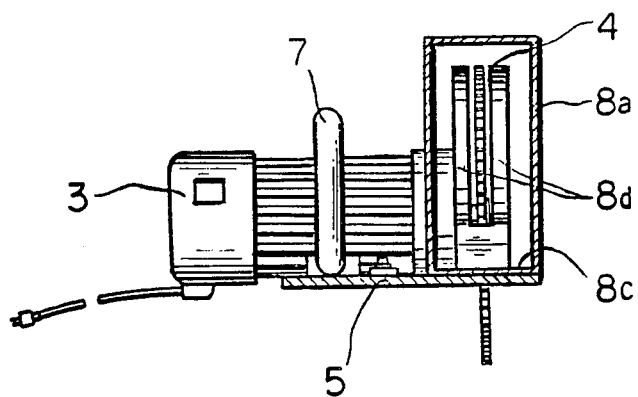
FIG. 7 is a vertical sectional view of the portable circular saw in FIG. 6.

As illustrated in FIGS. 6 and 7, the portable circular saw in accordance with the third embodiment includes a pair of inner wall discs $8_d$ which are constructed in the form of a combination of inner wall $8_b$ in the second embodiment and semicircular discs 2 in the first embodiment, the latter being vertically fixed to the longer sides of the former. It should be noted that the shorter sides of the inner wall discs $8_d$ are dimensioned to the same height as that in the second embodiment.

As is readily understood from the above description, very reliable dust collection and noise reduction are achieved owing to the combined effect brought about by those of both the first and second embodiments. It is preferable that transparent plastic material is employed for the dust collecting hood in any case in order to make it possible to visually confirm how sawing chip and dust are accumulated in the dust collecting chamber.

What is claimed is:

1. A portable circular saw comprising a dust collecting hood removably mounted on a table so as to fully contain the upper part of the rotary sawing cutter, an inner wall included in said dust collecting hood to surround the central part of the rotary sawing cutter from edge to edge, a dust collecting chamber provided in the dust collecting hood at the lower part thereof, said dust collecting chamber being constructed by a combination of the lower part of the dust collecting hood, the peripheral part of a bottom plate of the hood on the table and the inner wall, and a pair of semicircular plates fixedly secured to longer sides of the inner wall, said semicircular plates vertically extending along the rotary sawing cutter with a close clearance kept therefrom.

* * * * *